US010891227B2

(12) United States Patent
Gupta et al.

(10) Patent No.: US 10,891,227 B2
(45) Date of Patent: Jan. 12, 2021

(54) DETERMINING MODIFIED TRACKS TO DESTAGE DURING A CACHE SCAN

(71) Applicant: INTERNATIONAL BUSINESS MACHINES CORPORATION, Armonk, NY (US)

(72) Inventors: Lokesh M. Gupta, Tucson, AZ (US); Warren K. Stanley, Loveland, CO (US); Edward H. Lin, Tucson, AZ (US); Kevin J. Ash, Tucson, AZ (US); Matthew G. Borlick, Tucson, AZ (US); Kyler A. Anderson, Sahuarita, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/204,683

(22) Filed: Nov. 29, 2018

(65) Prior Publication Data

US 2020/0174930 A1 Jun. 4, 2020

(51) Int. Cl.
*G06F 12/0804* (2016.01)

(52) U.S. Cl.
CPC .. *G06F 12/0804* (2013.01); *G06F 2212/1044* (2013.01)

(58) Field of Classification Search
CPC ............... G06F 1/00–3296; G06F 3/00; G06F 3/06–0689; G06F 5/00–16;

(Continued)

(56) References Cited

U.S. PATENT DOCUMENTS 4,395,763 A * 7/1983 Takahashi ........... G06F 12/0864
711/100
4,530,054 A * 7/1985 Hamstra ............. G06F 12/0804
365/228

(Continued)

OTHER PUBLICATIONS

WOW: Wise Ordering for Writes—Combining Spatial and Temporal Locality in Non-Volatile Caches; Gill et al; 4th USENIX Conference on File and Storage Technologies; 2005; retrieved from https://www.usenix.org/legacy/events/fast05/tech/full_papers/gill/gill.pdf on Jan. 16, 2018; pp. 129-142 (14 pages) (Year: 2005).*

(Continued)

*Primary Examiner* — Daniel C. Chappell
(74) *Attorney, Agent, or Firm* — David W. Victor; Konrad Raynes Davda & Victor LLP

(57) ABSTRACT

Provided are a computer program product, system, and method for determining modified tracks to destage during a cache scan. A cache scan is initiated at a time interval to determine modified tracks to destage from a cache to the first or second storage. A modified track is processed during the cache scan. The modified track is destaged to the first storage in response to the modified track stored in the first storage. A determination is made as to whether there was a host write to the second storage since a previous cache scan in response to the modified track stored in the second storage. The modified track is destaged to the second storage in response to determining that there was a host write to the second storage since the previous cache scan.

21 Claims, 6 Drawing Sheets

(58) Field of Classification Search
CPC ........... G06F 8/00–78; G06F 9/00–548; G06F 11/00–3696; G06F 12/00–16; G06F 13/00–4295; G06F 15/00–825; G06F 16/00–986; G06F 21/00–88; G06F 2003/0691–0698; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153

See application file for complete search history.

(56) References Cited

U.S. PATENT DOCUMENTS

| | | | | |
|---|---|---|---|---|
| 5,023,776 | A * | 6/1991 | Gregor | G06F 12/0811 711/118 |
| 5,388,222 | A * | 2/1995 | Chisvin | G06F 9/52 711/154 |
| 5,418,921 | A * | 5/1995 | Cortney | G06F 11/1008 711/113 |
| 5,448,719 | A * | 9/1995 | Schultz | G06F 12/0866 711/141 |
| 5,666,514 | A * | 9/1997 | Cheriton | G06F 11/1407 711/141 |
| 6,055,606 | A * | 4/2000 | Sharma | G06F 12/0804 365/230.05 |
| 6,065,099 | A * | 5/2000 | Clark | G06F 12/0804 711/133 |
| 6,141,731 | A * | 10/2000 | Beardsley | G06F 12/123 711/133 |
| 6,418,515 | B1 * | 7/2002 | Kurosawa | G06F 12/0804 711/135 |
| 6,513,097 | B1 * | 1/2003 | Beardsley | G06F 11/0724 711/113 |
| 6,785,771 | B2 * | 8/2004 | Ash | G06F 12/0804 711/112 |
| 8,572,056 | B2 | 10/2013 | Labuda et al. | |
| 8,930,619 | B2 * | 1/2015 | Barrell | G06F 11/1076 711/103 |
| 9,104,599 | B2 * | 8/2015 | Atkisson | G06F 11/108 |
| 2003/0105928 | A1 * | 6/2003 | Ash | G06F 12/0871 711/136 |
| 2003/0158999 | A1 * | 8/2003 | Hauck | G06F 12/0866 711/113 |
| 2012/0089795 | A1 * | 4/2012 | Benhase | G06F 11/1451 711/162 |
| 2012/0254547 | A1 * | 10/2012 | Benhase | G06F 11/0727 711/133 |
| 2013/0024626 | A1 * | 1/2013 | Benhase | G06F 12/0862 711/137 |
| 2014/0082283 | A1 * | 3/2014 | Ash | G06F 12/0802 711/118 |
| 2014/0365725 | A1 * | 12/2014 | Barrell | G06F 11/1076 711/113 |
| 2015/0134914 | A1 * | 5/2015 | Ash | G06F 12/0891 711/136 |
| 2015/0169475 | A1 * | 6/2015 | Brown | G06F 12/1466 711/163 |
| 2016/0378369 | A1 * | 12/2016 | Ash | G06F 11/1435 707/615 |
| 2017/0109226 | A1 * | 4/2017 | Ash | G06F 11/0772 |
| 2017/0111468 | A1 * | 4/2017 | Ash | H04L 67/2852 |
| 2018/0321998 | A1 * | 11/2018 | Borlick | G06F 11/1471 |
| 2019/0187920 | A1 * | 6/2019 | Gupta | G06F 3/0689 |
| 2019/0187921 | A1 * | 6/2019 | Gupta | G06F 3/067 |

OTHER PUBLICATIONS

H. H. S. Lee, G. S. Tyson and M. K. Farrens, "Eager writeback—a technique for improving bandwidth utilization," Proceedings 33rd Annual IEEE/ACM International Symposium on Microarchitecture. MICRO-33 2000, Monterey, CA, USA, 2000, pp. 11-21 (Year: 2000).*

Anujan Varma and Quinn Jacobson. 1995. Destage algorithms for disk arrays with non-volatile caches. In <i>Proceedings of the 22nd annual international symposium on Computer architecture</i> (<i>ISCA '95</i>). Association for Computing Machinery, New York, NY, USA, 83-95 (Year: 1995).*

"Method and System for Self Adjusting Safe Data Commit Scan," ip.com, ip.com No. IPCOM000247908D, Oct. 11, 2016, 1 page.

"Efficient Metadata Destage During Safe Data Commit Operation", by Gupta et al., U.S. Appl. No. 16/162,391, filed Oct. 17, 2018, 30 pp.

* cited by examiner

DETERMINING MODIFIED TRACKS TO DESTAGE DURING A CACHE SCAN

BACKGROUND OF THE INVENTION

1. Field of the Invention

The present invention relates to a computer program product, system, and method for determining modified tracks to destage during a cache scan.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. A cache management system may maintain a linked list having one entry for each track stored in the cache, which may comprise write data buffered in cache before writing to the storage device or read data. In the commonly used Least Recently Used (LRU) cache technique, if a track in the cache is accessed, i.e., a cache "hit", then the entry in the LRU cache list for the accessed track is moved to a Most Recently Used (MRU) end of the list. If the requested track is not in the cache, i.e., a cache miss, then the track in the cache whose entry is at the LRU end of the list may be removed and demoted and an entry for the track data staged into cache from the storage is added to the MRU end of the LRU list. With this LRU cache technique, tracks that are more frequently accessed are likely to remain in cache, while data less frequently accessed will more likely be removed from the LRU end of the list to make room in cache for newly accessed tracks.

To avoid the cache from becoming full, tracks need to be demoted, i.e., removed from cache or invalidated in cache, to make room for newly accessed tracks. To remove tracks from cache, a cache scan may periodically run, such as every hour, to destage all modified tracks, so that anything written prior to the time of the start of the cache scan is destaged and safely on disk. If there are additional volumes maintaining copies of a primary volume, then the commit scan may also run on the secondary copy volumes independently to destage tracks every commit scan interval. If there is data loss, then only data written after the cache scan time needs to be stored.

There is a need in the art for improved techniques for destaging tracks from the cache.

SUMMARY

Provided are a computer program product, system, and method for determining modified tracks to destage during a cache scan. A cache scan is initiated at a time interval to determine modified tracks to destage from a cache to the first or second storage. A modified track is processed during the cache scan. The modified track is destaged to the first storage in response to the modified track stored in the first storage. A determination is made as to whether there was a host write to the second storage since a previous cache scan in response to the modified track stored in the second storage. The modified track is destaged to the second storage in response to determining that there was a host write to the second storage since the previous cache scan.

DETAILED DESCRIPTION

A cache scan ensures that modified tracks as of the time of the cache scan are written to disk. In a copy relationship environment, where there is a primary volume and one or more secondary copy volumes providing a copy of the primary volume, a separate scan may be initiated for each of the different volumes. All these scan operations to destage tracks may increase processing burdens on the storage controller, which in turn increases latency to process host I/O requests while storage controller tasks are redirected to destaging operations.

Described embodiments provide improvements to computer technology for reducing the processing burdens of cache scans to destage tracks by avoiding a cache scan if there has been no host I/O activity toward the volumes since a last cache scan. Further, if a cache scan is at an interval less than a fixed number of intervals, i.e., an intermediary interval, then modified tracks for a secondary storage having copies of tracks in the primary volume are not destaged unless there was a host write to the secondary storage since the last cache scan. This reduces the burdens of destaging operations by avoiding destaging modified tracks during time intervals between a fixed number of intervals in secondary copy storages that are not host writes, but instead data from the primary volume being copied to the secondary storage during. Reducing the number of operations to destage modified tracks that comprise primary data being copied to the secondary copy volumes reduces processing burdens on the storage controller and reduces I/O response time latency to host I/O requests without risking losing critical customer data, which is destaged. If the tracks being copied to the secondary volumes are lost, they can be recovered from the tracks in the primary volume being copied. However, with described embodiments, if the modified tracks for the secondary copy storages may comprise host writes, then they are destaged to the secondary volumes to avoid the risk of losing customer data being written from the host.

Figure 1:
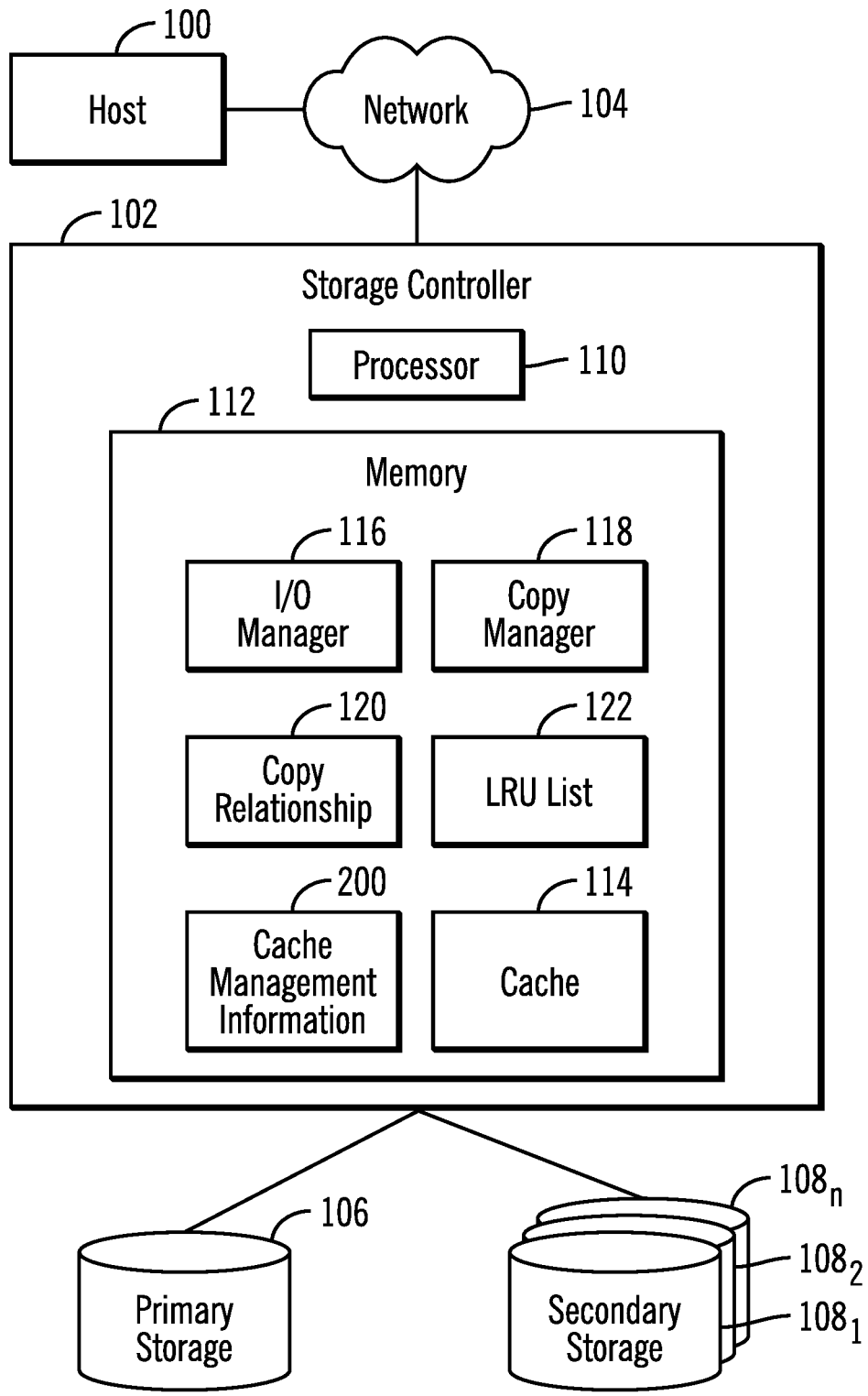
FIG. 1 illustrates an embodiment of a storage environment.

FIG. 1 illustrates an embodiment of a data storage environment having one or more host systems 100 100 connected to a storage controller 102 over a network 104. The storage controller 102 manages access to tracks configured in a primary storage 106 and one or more secondary storages $108_1 \ldots 108_n$. A storage may comprise a volume or any other unit of configured storage. The storage controller 102 includes one or more processors 110 and a memory 112, including a cache 114 to cache data for the storages 106, $108_1 \ldots 108_n$. The processor 110 may comprise a separate central processing unit (CPU), one or a group of multiple cores on a single CPU, or a group of processing resources on one or more CPUs. The cache 114 buffers data transferred between the hosts 100 and the storages 106, $108_1 \ldots 108_n$.

The memory 112 includes an Input/Output (I/O) manager 116 for managing the transfer of tracks transferred between the hosts 100 and the storages 106, $108_1 \ldots 108_n$ and storage in the cache 114. A track may comprise any unit of data configured in the storage 106, $108_1 \ldots 108_n$, such as a track, Logical Block Address (LBA), storage cell, group of cells (e.g., column, row or array of cells), sector, segment, etc., which may be part of a larger grouping of tracks, such as a volume, logical device, etc. The memory 112 further includes a copy manager 118 to manage copy operations from the primary storage 106 to one or more secondary storages $108_1 \ldots 108_n$ that provide a copy of the data in the primary storage 106. The copy manager 118 may manage a mirror copy where any updates to tracks in the primary storage 106 are immediately mirrored or copied to a mirrored secondary storage $108_i$. The copy manager 118 may further manage a secondary volume $108_i$ as a point-in-time copy, such as a snapshot, FlashCopy® (FlashCopy is a registered trademark of IBM), snapshot, etc. For a point-in-time copy secondary storage $108_i$. The copy manager 118 stores point-in-time data for the primary storage 106 in a point-in-time copy secondary storage $108_i$. The point-in-time data copied to the secondary storage $108_i$ comprises a version of a track in the primary storage 106 before being updated by a modified track in the cache 114. Point-in-time copy techniques typically defer the transfer of the data in the source volume at the time the point-in-time copy relationship was established to the copy target volume until a write operation is requested to that data block on the source volume. The point-in-time copy comprises the combination of the data in the primary storage 106 and the data to be overwritten by the updates transferred to the point-in-time copy (secondary) volume $108_i$.

The copy manager 118 maintains copy relationships 120 having information on copy relationships between the primary storage 106 and secondary storages $108_1 \ldots 108_n$, including information on mirror copy relationships, synchronous and/or asynchronous, point-in-time copy relationships, and other types of copy relationships known in the art.

The memory 112 includes a Least Recently Used (LRU) list 122 having an ordered list of tracks in the cache 114, having a most recently used (MRU) end at which a track is added to the cache 114 and a least recently used (LRU), of an oldest track in the cache, from which tracks are removed, e.g., destaged or demoted from the cache 114. The memory 112 includes cache management information 200 that the I/O manager 116 uses to scan the LRU list 122 to destage modified tracks in the cache 114 to the storages 106, $108_1 \ldots 108_n$.

In one embodiment, the I/O manager 116 may partition the cache 114 into chunks and create separate task control blocks to process the tracks in those chunks to determine whether to destage to parallel process tracks in the cache to destage. There may be separate LRU lists 122 for each of the partitions of tracks in the cache or the separate tasks may share a same LRU list 122. Alternatively, one task may be used to process the LRU list 122 to determine modified tracks to destage from the cache 114.

The storages 106, $108_1 \ldots 108_n$, may comprise volumes configured in Logical Subsystems (LSS), where each LSS is comprised of multiple volumes. The term volume as used herein may refer to other types of storage units comprising addressable ranges of data, such as logical devices, logical drives, partitions, etc. A track comprises any addressable storage unit representing data in storage and memory, also referred to as a block, logical address, logical block address (LBA), physical block address, etc.

In one embodiment, the storages 106, $108_1 \ldots 108_n$ may be configured in the same storage enclosure and accessible over a network 104 connection, or may be in separate storage enclosures with each storage enclosure or system accessible over the network 104.

The storage controller 102 may comprise an enterprise storage controller/server suitable for managing access to attached storage devices, such as, but not limited to, the International Business Machine Corporation's ("IBM") DS8000® storage system or other vendor storage servers known in the art. (DS8000 is a registered trademark of IBM in countries throughout the world).

The network 104 may comprise a Storage Area Network (SAN), Local Area Network (LAN), Intranet, the Internet, Wide Area Network (WAN), peer-to-peer network, wireless network, arbitrated loop network, etc.

The storages 106, $108_1 \ldots 108_n$ may each be implemented in one or more storage devices, or an array of storage devices, may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage devices, such as Just a Bunch of Disks (JBOD), Direct Access Storage Device (DASD), Redundant Array of Independent Disks (RAID) array, virtualization device, etc. Further, the storage devices in the storage $106_i$ may comprise heterogeneous storage devices from different vendors and different types of storage devices, such as a first type of storage devices, e.g., hard disk drives, that have a slower data transfer rate than a second type of storage devices, e.g., SSDs.

The memory 112 may comprise a suitable volatile or non-volatile memory for storing storage controller 102 data and programs.

The I/O manager 116 and copy manager 118 may comprise program code loaded into memory and executed by a processor. Alternatively, some or all of the functions may be implemented in hardware devices, such as in Application Specific Integrated Circuits (ASICs) or executed by separate dedicated processors.

Figure 2:
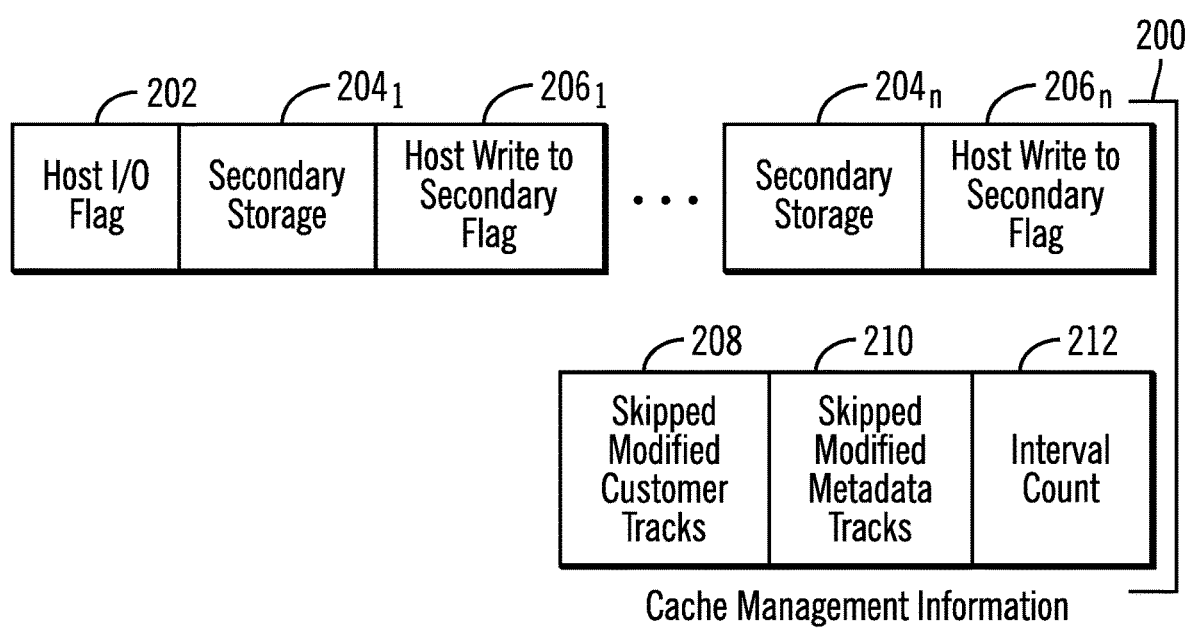
FIG. 2 illustrates an embodiment of cache management information.

FIG. 2 illustrates an embodiment of the cache management information 200 used to perform cache scans of the cache 114 and includes: a host Input/Output (I/O) flag 202 indicating whether there has been a read or write access from a host 100 to any of the storages 106, $108_1 \ldots 108_n$ since the last cache scan; for each identified secondary storage $204_1 \ldots 204_n$, a host write-to-secondary flags $206_1 \ldots 206_n$, respectively, indicating whether there has been a host write to the corresponding secondary storage since the last cache scan; skipped modified customer tracks 208 indicating a number of modified tracks of customer data for the secondary storages $108_1 \ldots 108_n$ that were not destaged because they did not comprise host writes, and instead comprised data being copied from the primary storage 106 to the secondary storages $108_1 \ldots 108_n$ as part of a copy relationship 120; and skipped modified metadata tracks 210 indicating a number of modified metadata tracks that were not destaged. Metadata comprises a track having information on customer data tracks in the storages $106, 108_1 \ldots 108_n$, such as track layout, and are updated when the format of the track is modified; and an interval count 212 indicating a number of time intervals that have occurred, which is reset after a fixed number of time intervals. A time interval may comprise any type of time interval, such as a number of seconds, minutes, hours or clock cycles generated by a clock circuit within the storage controller 102.

The cache scans are initiated by setting flags 202, $204_1 \ldots 204_n$ to indicate no host activity and the interval count 212 is set to zero.

Figure 3:
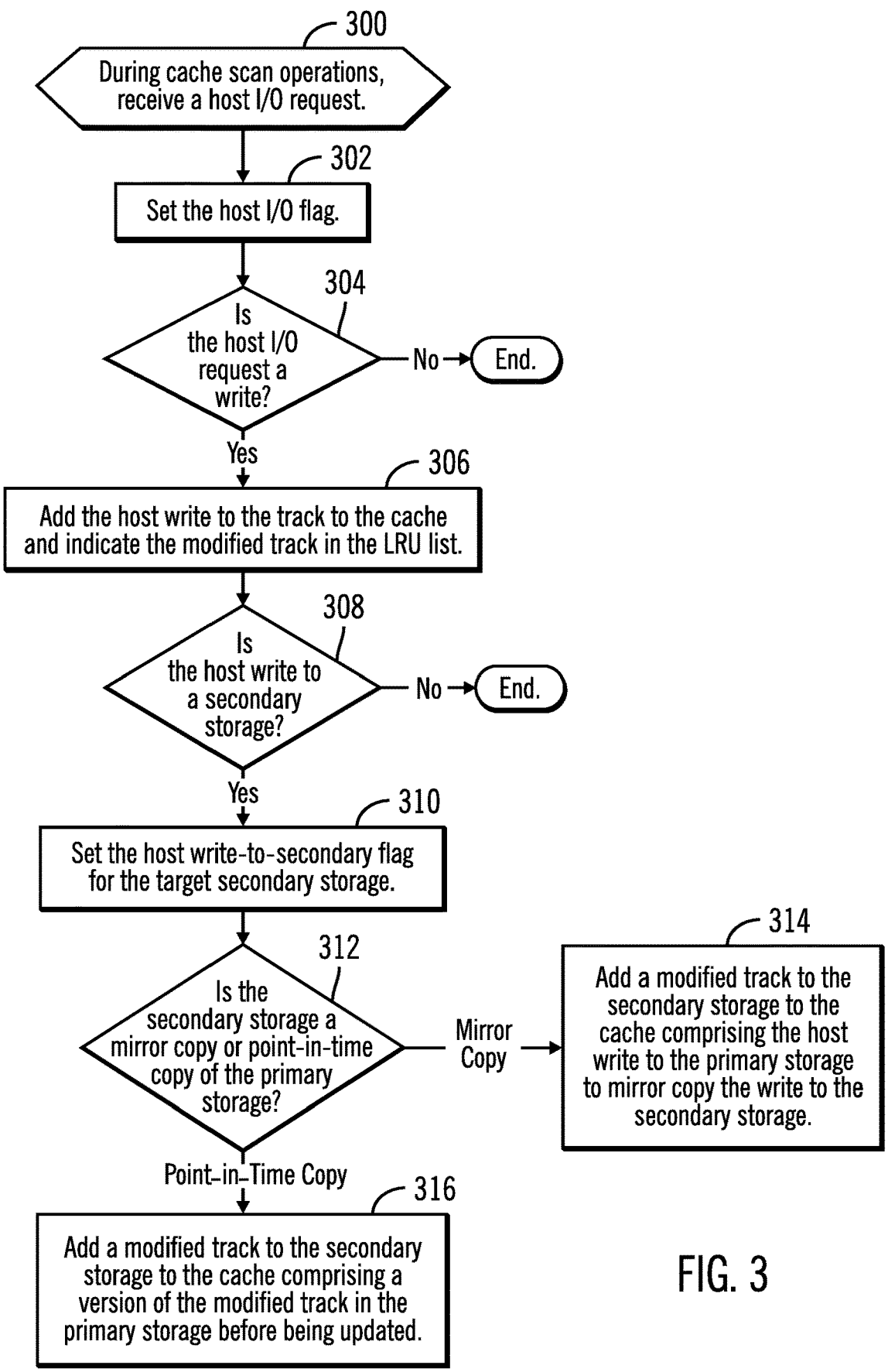
FIG. 3 illustrates an embodiment of operations to process a host Input/Output (I/O) request during a cache scan.

FIG. 3 illustrates an embodiment of operations to process a host I/O request from a host 100 received while cache scans are being performed at the cache scan time interval. Upon receiving (at block 300) a host I/O request, such as a read or write, the host I/O flag 202 is set to indicate the request was received. If (at block 304) the host I/O request is a read, then the read is processed and control ends. If (at block 304) the request is a write, then the host write to the track is added (at block 306) to the cache 114 and the modified track in the cache 114 is indicated in the LRU list 122. If (at block 308) the host write is to a secondary storage $108_1 \ldots 108_n$ in a copy relationship 120, the host write-to-secondary flag $206_i$ for the target secondary storage $204_i$ having the track being written is set (at block 310) to indicate a host write was received for the secondary storage $204_i$. If (at block 312) the copy relationship 120 indicates the secondary storage $108_i$ to which the write is directed is a mirror copy of the primary storage 106, then the I/O manager 116 or copy manager 118 adds (at block 314) a modified track for the secondary storage $108_i$ to the cache 114 comprising the host write to the primary storage 106 to mirror copy the write to the secondary storage $108_1$. If (at block 312) the copy relationship 120 indicates the target secondary storage $108_i$ is a point-in-time copy, then a modified track to the secondary storage added to the cache comprises a version of the modified track in the primary storage 106 before being updated by the host write.

With the embodiment of FIG. 3, the host I/O flag 202 and the host write-to-secondary flags $206_i$ are set to indicate I/O activity between scans to use to determine whether to destage modified tracks to ensure that host I/O writes are destaged while at the same time deferring writes to the secondary storages $108_1 \ldots 108_n$, that are part of mirror or point-in-time copy operations. In this way, destaging operations are minimized without affecting destaging of host writes in order to reduce processing burdens and latency in writing host writes and responding to host reads on the storage controller 102.

Figure 4:
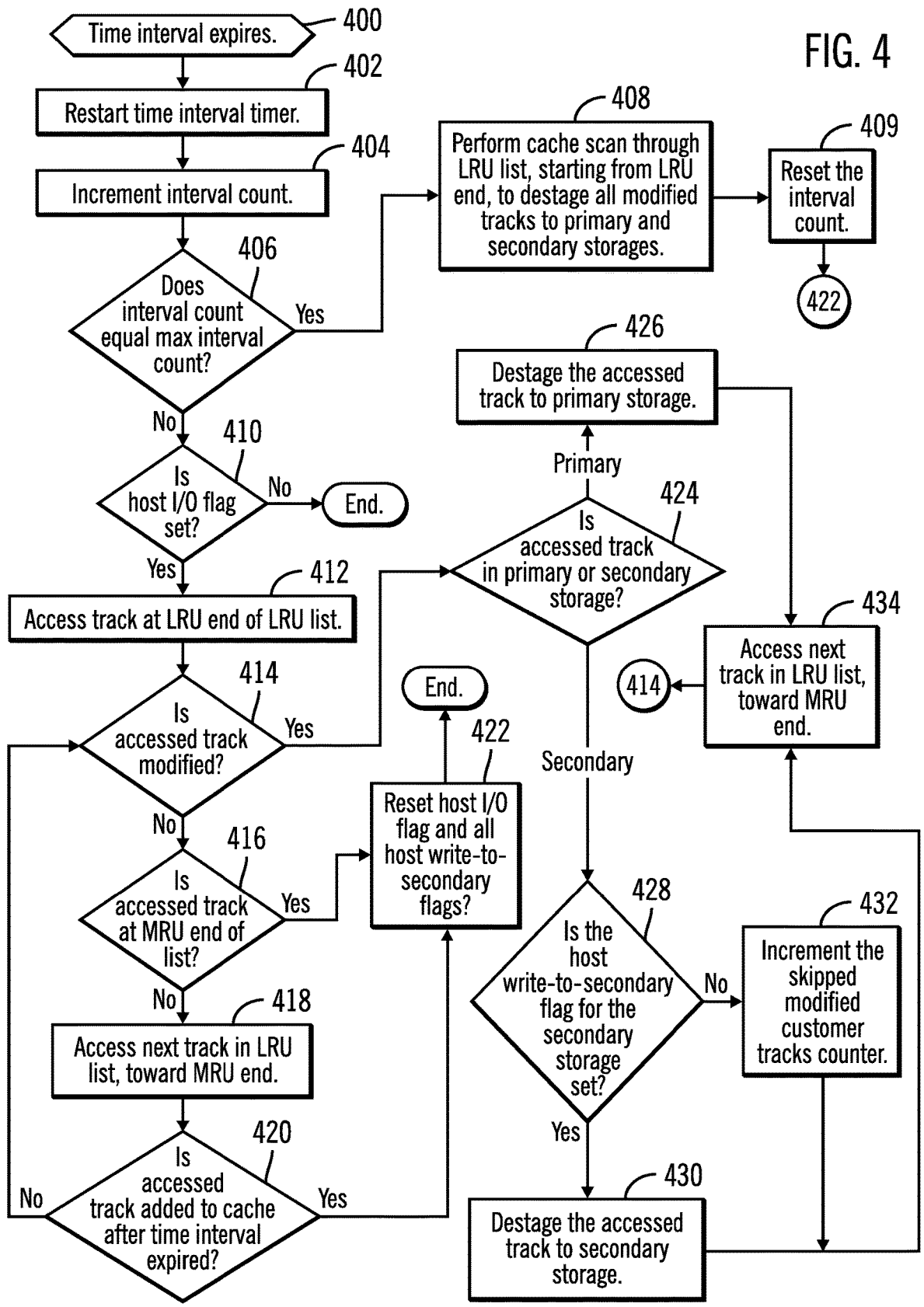
FIG. 4 illustrates an embodiment of operations to perform a cache scan every time interval.

FIG. 4 illustrates an embodiment of operations performed by the I/O manager 116 to perform a cache scan at the expiration of a time interval. Upon a time interval expiring (at block 400), the time interval is restarted (at block 402) and the interval count 212 is incremented (at block 404). If (at block 406) the interval count 212 is equal to the maximum interval count, then the I/O manager 116 performs (at block 408) a cache scan through the LRU list 122, starting from LRU end, to destage all modified tracks to primary 106 and secondary $108_1 \ldots 108_n$ storages. The interval count is then reset (at block 409). In this way, at a predefined number of intervals, all modified tracks are destaged to ensure that the modified tracks for copy relationships 120 are destaged to the secondary storages $108_1 \ldots 108_n$ to implement the copy relationships and provide the secondary copy of the primary storage 106 at the secondary storages $108_1 \ldots 108_n$. However, by limiting destaging of all modified tracks for the copy relationships to every fixed number of time intervals, the destaging processing burdens on the storage controller 102 are limited to reduce latency to process host I/O requests between the maximum number of intervals.

If (at block 406) the interval count 212 is not the maximum number, then if (at block 410) the host I/O flag 202 is set to indicate a host I/O request, e.g., read or write, has occurred to one of the storages $106, 108_1 \ldots 108_n$, then the cache scan is initiated at block 412 by accessing a track at the LRU end of the LRU list 122, which is the oldest track in the cache 114. If (at block 410) the host I/O flag 202 is not set, control ends without performing a scan because there are no host accesses to trigger intermediary scan. If (at block 414) the accessed track is not modified and if (at block 416) the accessed track is not at the MRU end of the LRU list 122, i.e., the most recent end, then the next track in the LRU list 122 is accessed (at block 418), toward the MRU end. If (at block 420) the next accessed track was added to the cache 114 after the time interval expired, then cache scanning is ended. If (at block 420) the accessed track was added prior to the time interval expiring, then control proceeds back to block 414 for further cache scanning. If the cache scanning has ended by reaching the MRU end of the LRU list 122 (from the yes branch of block 416), or after processing all tracks added prior to the time interval expiring, which is reached when hitting the first track added after the time interval expired, (from the yes branch of block 420) or after resetting the interval count 212 after performing an entire cache scan (at block 409), then the host I/O flag 202 and all the host write-to-secondary flags $206_1 \ldots 206_n$ are reset (at block 422) and control ends until the next time interval expires.

If (at block 414) the track is modified and if (at block 424) the accessed track is in the primary storage 106, then the accessed modified track is destaged (at block 426) to the primary storage 106. In this way, all modified tracks to the primary storage 106 are always destaged because such data cannot be easily recovered in case of a failure. If (at block 424) the accessed modified track is for a secondary storage $108_i$ and if (at block 428) the host write-to-secondary flag $206_i$ for the secondary storage $108_i$ is set, indicating a host write was received to that secondary storage $108_i$, then the accessed modified track is destaged (at block 430) to the target secondary storage $108_i$, because it may comprise a host write. If (at block 428) the host write-to-secondary flag $206_i$ is not set, then the skipped modified customer tracks counter 208 is incremented (at block 432). After destaging the track (at block 426 or 430) or after incrementing (at block 432) the counter 210 if the host write-to-secondary flag $206_i$ is not set, in which case the accessed modified track is skipped without destaging, then the next track in the LRU list 122 is accessed (at block 434), toward the MRU end, and control proceeds back to block 414 to process that next accessed modified track.

With the embodiment of FIG. 4, after a fixed number of time intervals expires, then all the contents of the cache 114 are destaged to ensure that all the modified tracks to secondary storages $108_1 \ldots 108_n$ that are part of a copy relationship to copy the primary storage 106 are destaged. However, during intervals between the fixed number of intervals, modified host writes to the primary storage 106 and the secondary volumes $108_1 \ldots 108_n$ are always destaged because those are more difficult to recover. However, modified tracks comprising tracks being copied to the secondary storages $108_1 \ldots 108_n$ as part of copy relationships to create the secondary copies, e.g., mirror or point-in-time copies, are not copied if there are no host writes to reduce destage processing burdens in the storage controller 102 and latency to respond to host 100 I/O requests.

The skipped modified customer tracks 208 may be used to determine whether the number of modified tracks skipped exceeds various thresholds indicating that too many modified tracks are being skipped to wait for the fixed number of time intervals to be destaged, which may overburden destaging after the fixed number of time intervals occur.

Figure 5:
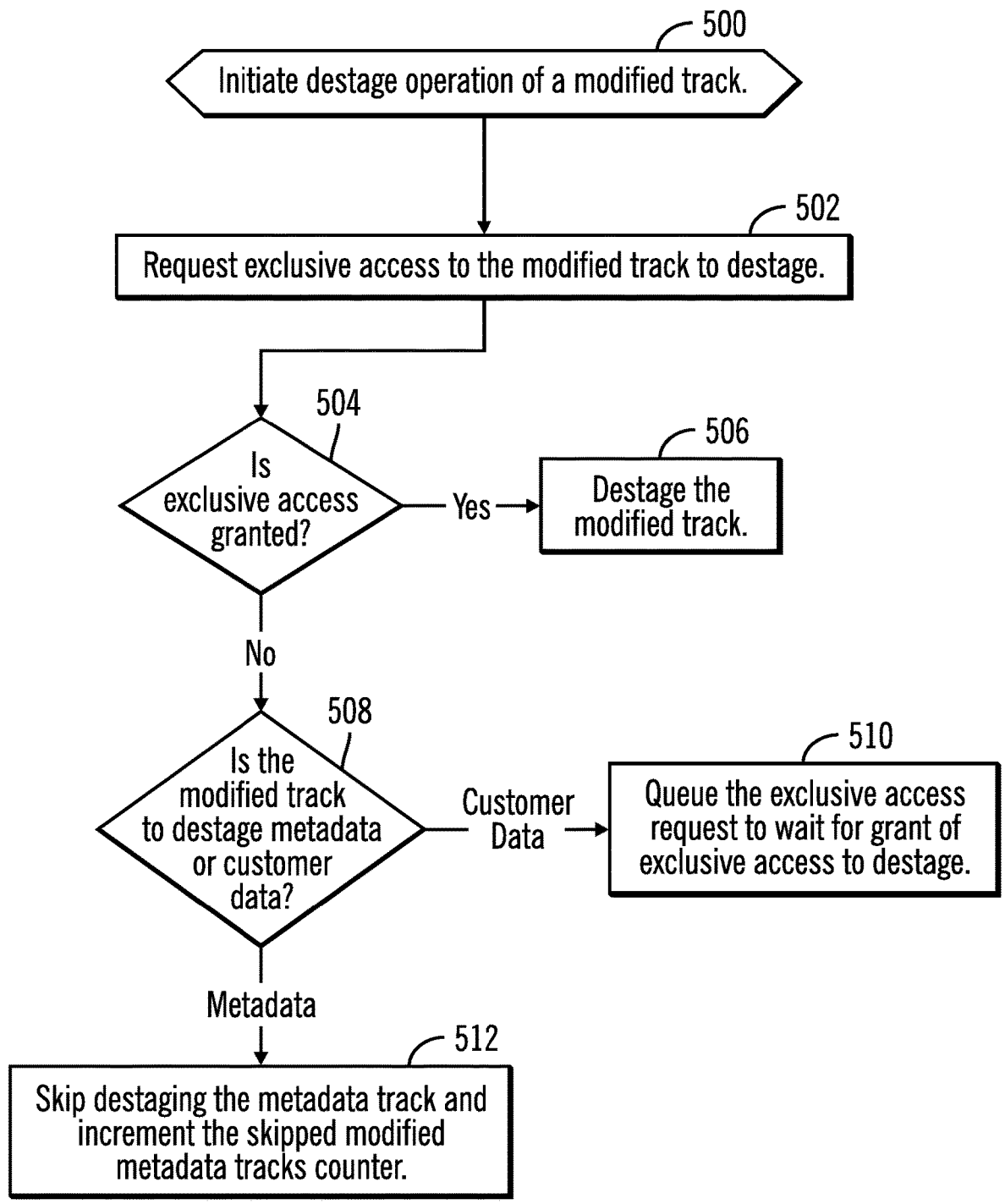
FIG. 5 illustrates an embodiment of operations to destage a track from cache.

FIG. 5 illustrates an embodiment of the destage operations performed by the I/O manager 116 after a modified track is selected to destage according to the operation of FIG. 4. Upon initiating (at block 500) a destage operation of a modified block, the I/O manager 116 requests (block 502) exclusive access to the modified track to destage. If (at block 504) exclusive access was granted, then the modified track is destaged (block 506) to the storage 106, $108_1$. If (at block 504) exclusive access is not granted, then if (at block 508) the modified track comprises customer data, then the exclusive access request is queued (at block 510) and the I/O manager 116 waits for the grant of exclusive access to destage the modified customer data. If (at block 508) the modified track comprises metadata, then the I/O manager 116 skips (at block 512) the destaging the metadata track and increments the skipped modified metadata tracks counter 210. The skipped modified customer 208 and metadata 210 tracks counter may be used to determine whether the number of modified tracks skipped exceeds various thresholds indicating that too many modified customer data and metadata tracks are being skipped to wait for the fixed number of time intervals to be destaged, which may overburden destaging after the fixed number of time intervals occur.

With the embodiment of FIG. 5, destaging customer data tracks will wait for an exclusive lock to be granted to destage because of the difficulty of recovering the data, but the destaging of modified metadata tracks may be skipped if the lock is not granted because metadata tracks may be recovered by processing the customer data tracks to determine the layout and format.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
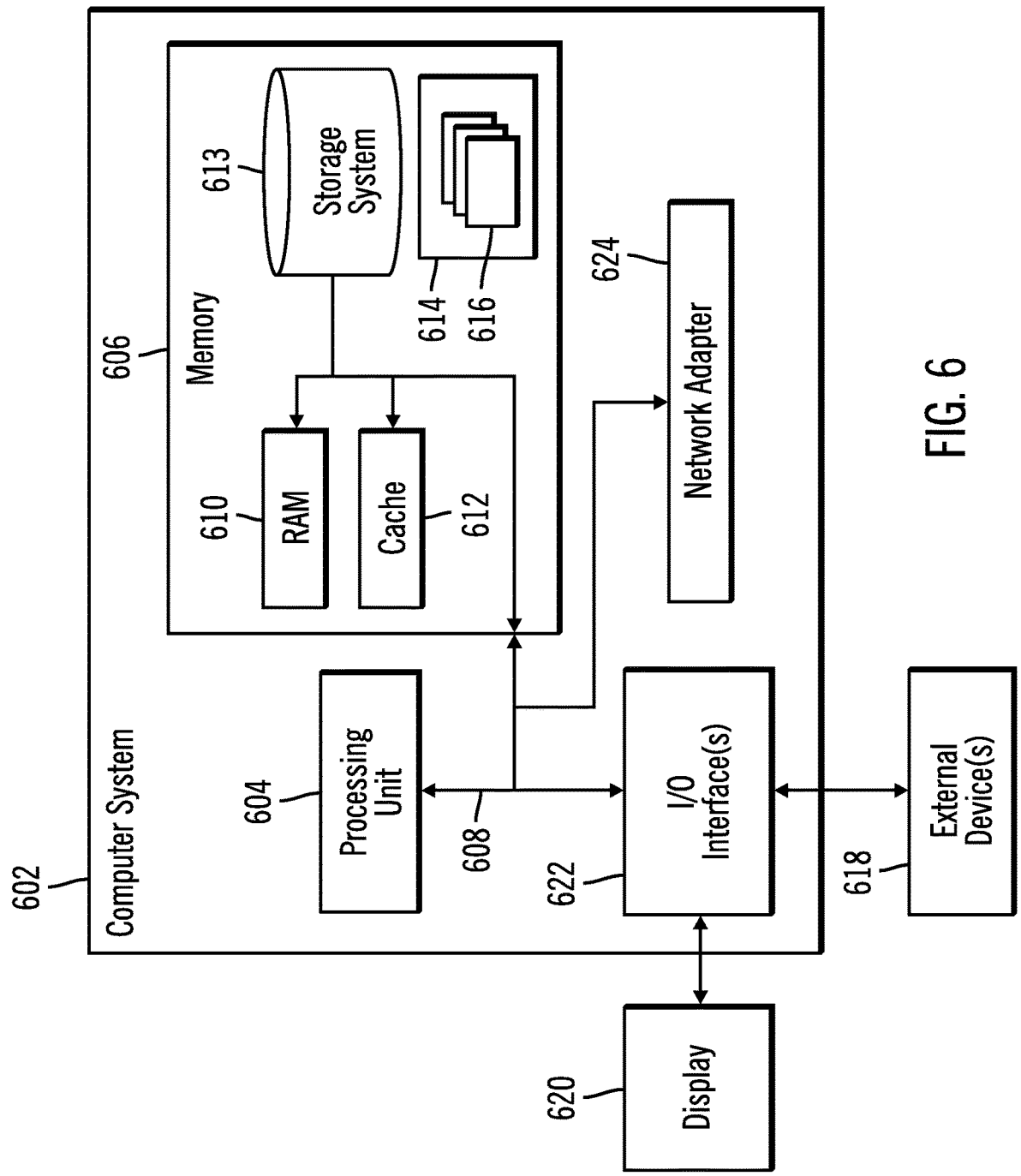
FIG. 6 illustrates a computing environment in which the components of FIG. 1 may be implemented.

The computational components of FIG. 1, including the host 100 and storage controller 102 may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for destaging modified tracks to a first storage and a second storage and configured to communicate with a host, wherein the computer program product comprises a computer readable storage medium having program instructions embodied therewith, the program instructions executable by a processor to cause operations, the operations comprising:

initiating a cache scan at a time interval to determine modified tracks to destage from a cache to the first or the second storage;

processing a modified track during the cache scan;

destaging the modified track to the first storage in response to the modified track stored in the first storage;

determining whether there is an indication there was a host write to the second storage since a previous cache scan in response to the modified track stored in the second storage; and destaging the modified track to the second storage, before considering a next modified track to destage to the first storage or the second storage, in response to determining that there is the indication that there was a host write to the second storage since the previous cache scan.

2. The computer program product of claim 1, wherein the operations further comprise:

at the time interval, determining whether the host sent a host Input/Output (I/O) request to a track in the first or the second storage since the previous cache scan, wherein the cache scan is initiated in response to determining that the host I/O request was sent since the previous cache scan.

3. The computer program product of claim 1, wherein the operations further comprise:

in response to a fixed number of time intervals, performing a cache scan to destage modified tracks in the cache to the first storage and the second storage.

4. The computer program product of claim 3, wherein the modified track comprises a first modified track, wherein the operations further comprise:

including in the cache a second modified track for the first storage to write to the second storage; and destaging, during a cache scan, the second modified track to the second storage in response to at least one of determining a host write to the second storage since the previous cache scan and the fixed number of time intervals.

5. The computer program product of claim 1, wherein the first storage comprises a primary storage and wherein the second storage comprises a secondary storage having a copy of the primary storage, wherein there are a plurality of secondary storages providing separate copies of the primary storage, wherein the determining whether there was a host write to the secondary storage and the destaging the modified track to the secondary storage are performed for a modified track to any one of the secondary storages.

6. The computer program product of claim 1, wherein the first storage comprises a primary storage and wherein the second storage comprises a secondary storage having a copy of the primary storage, wherein the secondary storage comprises one of a mirror copy storage to which writes to the primary storage are mirrored to the secondary storage and a point-in-time copy storage to which tracks in the primary storage are copied to the point-in-time copy storage before being updated, wherein a modified track for the secondary storage comprises write data for the primary storage when the secondary storage provides a mirror copy storage of the primary storage, and wherein a modified track for the secondary storage comprises a version of a track in the primary storage before being updated by the modified track.

7. The computer program product of claim 1, wherein the operations further comprise:

incrementing a counter indicating a number of modified tracks not destaged in response to determining that there was no host write to the second storage since the previous cache scan, wherein the modified track is not destaged in response to determining that there was no host write to the second storage since the previous cache scan.

8. The computer program product of claim 1, wherein the operations further comprise:

setting a first flag in response to a host (Input/Output) I/O request to the first or the second storage, wherein the cache scan is initiated in response to determining that the first flag is set;

setting a second flag in response to a host write request to the second storage, wherein the determining that there is the host write to the second storage comprises determining that the second flag is set; and resetting the first flag and the second flag in response to completing the cache scan.

9. The computer program product of claim 1, wherein the operations further comprise:
   requesting exclusive access to the modified track to destage the modified track to the first or the second storage;
   queuing a request for exclusive access to the modified track to wait for exclusive access being granted to destage the modified track in response to the exclusive access not being granted and the modified track comprising customer data; and
   considering a next track in the cache as part of the cache scan without destaging the modified track in response to the exclusive access not being granted and the modified track comprising metadata.

10. A system configured to communicate with a first storage, a second storage, and a host, comprising:
   a processor;
   a cache; and
   a computer readable storage medium having program instructions that when executed by the processor causes operations, the operations comprising:
      initiating a cache scan at a time interval to determine modified tracks to destage from the cache to the first or the second storage;
      processing a modified track during the cache scan;
      destaging the modified track to the first storage in response to the modified track stored in the first storage;
      determining whether there is an indication there was a host write to the second storage since a previous cache scan in response to the modified track stored in the second storage; and
      destaging the modified track to the second storage, before considering a next modified track to destage to the first storage or the second storage, in response to determining that there is the indication that there was a host write to the second storage since the previous cache scan.

11. The system of claim 10, wherein the operations further comprise:
   at the time interval, determining whether the host sent a host Input/Output (I/O) request to a track in the first or the second storage since the previous cache scan, wherein the cache scan is initiated in response to determining that the host I/O request was sent since the previous cache scan.

12. The system of claim 10, wherein the operations further comprise:
   in response to a fixed number of time intervals, performing a cache scan to destage modified tracks in the cache to the first storage and the second storage.

13. The system of claim 12, wherein the modified track comprises a first modified track, wherein the operations further comprise:
   including in the cache a second modified track for the first storage to write to the second storage; and
   destaging, during a cache scan, the second modified track to the second storage in response to at least one of determining a host write to the second storage since the previous cache scan and the fixed number of time intervals.

14. The system of claim 10, wherein the operations further comprise:
   setting a first flag in response to a host (Input/Output) I/O request to the first or the second storage, wherein the cache scan is initiated in response to determining that the first flag is set;
   setting a second flag in response to a host write request to the second storage, wherein the determining that there is the host write to the second storage comprises determining that the second flag is set; and
   resetting the first flag and the second flag in response to completing the cache scan.

15. The system of claim 10, wherein the operations further comprise:
   requesting exclusive access to the modified track to destage the modified track to the first or the second storage;
   queuing a request for exclusive access to the modified track to wait for exclusive access being granted to destage the modified track in response to the exclusive access not being granted and the modified track comprising customer data; and
   considering a next track in the cache as part of the cache scan without destaging the modified track in response to the exclusive access not being granted and the modified track comprising metadata.

16. A method for destaging modified tracks to a first storage and a second storage, comprising:
   initiating a cache scan at a time interval to determine modified tracks to destage from a cache to the first or the second storage;
   processing a modified track during the cache scan;
   destaging the modified track to the first storage in response to the modified track stored in the first storage;
   determining whether there is an indication there was a host write to the second storage since a previous cache scan in response to the modified track stored in the second storage; and
   destaging the modified track to the second storage, before considering a next modified track to destage to the first storage or the second storage, in response to determining that there is the indication that there was a host write to the second storage since the previous cache scan.

17. The method of claim 16, further comprising:
   at the time interval, determining whether the host sent a host Input/Output (I/O) request to a track in the first or the second storage since the previous cache scan, wherein the cache scan is initiated in response to determining that the host I/O request was sent since the previous cache scan.

18. The method of claim 16, further comprising:
   in response to a fixed number of time intervals, performing a cache scan to destage modified tracks in the cache to the first storage and the second storage.

19. The method of claim 18, wherein the modified track comprises a first modified track, further comprising:
   including in the cache a second modified track for the first storage to write to the second storage; and
   destaging, during a cache scan, the second modified track to the second storage in response to at least one of determining a host write to the second storage since the previous cache scan and the fixed number of time intervals.

20. The method of claim 16, further comprising:
   setting a first flag in response to a host (Input/Output) I/O request to the first or the second storage, wherein the cache scan is initiated in response to determining that the first flag is set;
   setting a second flag in response to a host write request to the second storage, wherein the determining that there is the host write to the second storage comprises determining that the second flag is set; and resetting the first flag and the second flag in response to completing the cache scan.

21. The method of claim 16, further comprising:

requesting exclusive access to the modified track to destage the modified track to the first or the second storage;

queuing a request for exclusive access to the modified track to wait for exclusive access being granted to destage the modified track in response to the exclusive access not being granted and the modified track comprising customer data; and considering a next track in the cache as part of the cache scan without destaging the modified track in response to the exclusive access not being granted and the modified track comprising metadata.

\* \* \* \* \*